United States Patent [19]
Dietle et al.

[11] Patent Number: 5,823,541
[45] Date of Patent: Oct. 20, 1998

[54] ROD SEAL CARTRIDGE FOR PROGRESSING CAVITY ARTIFICIAL LIFT PUMPS

[75] Inventors: Lannie L. Dietle, Sugar Land; William T. Conroy, Pearland, both of Tex.

[73] Assignee: Kalsi Engineering, Inc., Sugar Land, Tex.

[21] Appl. No.: 615,539

[22] Filed: Mar. 12, 1996

[51] Int. Cl.⁶ ..................................................... F16J 15/32
[52] U.S. Cl. ........................ 277/320; 277/562; 277/563; 277/571
[58] Field of Search ................................ 27/2, 8, 15, 35, 27/59, 133, 136, 815, 36; 384/571, 489

[56] References Cited

U.S. PATENT DOCUMENTS

| | | | |
|---|---|---|---|
| 3,209,830 | 10/1965 | Orr et al. | 277/2 |
| 4,004,433 | 1/1977 | Calistrat | 277/133 |
| 4,130,287 | 12/1978 | Ritzie | 277/59 |
| 4,240,762 | 12/1980 | Lobanoff | 403/24 |
| 4,730,656 | 3/1988 | Goodell et al. | 277/59 |
| 5,222,746 | 6/1993 | Van Steenbrugge | 277/212 FB |
| 5,230,520 | 7/1993 | Dietle et al. | 277/134 |
| 5,333,882 | 8/1994 | Azibert et al. | 277/935 D |
| 5,344,164 | 9/1994 | Carmody et al. | 277/935 D |

OTHER PUBLICATIONS

Drawing GA1136 prepared by Kalsi Engineering, Inc. and supported by description letter dated Jun. 18, 1996 from Lannie L. Dietle to James L. Jackson and representing an Artificial Lift Pump Rod Seal Cartridge that was manufactured and sold by Ocean Engineering.

*Primary Examiner*—James R. Brittain
*Assistant Examiner*—John L. Beres
*Attorney, Agent, or Firm*—Bush, Riddle, & Jackson L.L.P.

[57] ABSTRACT

A seal cartridge particularly suitable for artificial lift pump rod sealing and for other applications where a rotating drive shaft penetrates a pressurized reservoir which is filled with abrasive-laden liquids, mixtures or slurries. The cartridge exploits a pressure responsive area of a wear sleeve to eliminate internal bearing running clearance in order to achieve a true-running rubbing surface which is conducive to the longevity of the compression-type rotary seals which are employed. A cartridge mounting mechanism is incorporated which overcomes stuffing box to rod misalignment, and is readily adaptable to pumps made by different manufacturers. The cartridge provides for leakage annunciation in the event of failure of a redundant rotary seal, and also provides for automatic pump shut down if a primary rotary seals fails. A redundant sealing arrangement between the wear sleeve and rod is incorporated which is relatively immune to installation damage, and to damage resulting from rod run out and vibration. By incorporation of a split drive clamp, the cartridge is able to exploit space within the pump yoke which is ordinarily reserved for the occasional use of rod clamps. The cartridge also incorporates an active cooling system which dissipates heat generated by the seals and bearings.

29 Claims, 2 Drawing Sheets

ROD SEAL CARTRIDGE FOR PROGRESSING CAVITY ARTIFICIAL LIFT PUMPS

FIELD OF THE INVENTION

This invention relates generally to rotary shaft drive mechanisms where a driven rotary shaft penetrates into a reservoir, containing a process liquid, such as when a driven rotary shaft or string of interconnected shafts are employed to drive a rotary downhole pump in a well or when a rotary shaft penetrates into through the wall vessel containing an abrasive liquid. More particularly, the present invention is directed to a seal cartridge for rotary shaft drive mechanisms, for establishing sealing at the shaft to reservoir wall interface and to prevent loss of process fluid from the reservoir. This invention is also directed to means for early detecting any seal leakage so that appropriate seal replacement and other servicing may be accomplished well before any significant process liquid loss occurs.

BACKGROUND OF THE INVENTION

The progressing cavity pump was first applied to oil well artificial lift usage about 17 years ago, and since then has steadily gained market share because of significant and well known economic and technical advantages over the beam pump. The progressing cavity artificial lift pump is relatively simple in principle concept, and consists of a compact surface mounted rotary drive head unit (sometimes called a "top drive") and a submersed Moineau-type rotor-stator arrangement. The pump stator is attached to the lower end of the tubing, and the rotor is attached to the lower end of a rod string typically consisting of conventional lift pump sucker rods. The rod string and rotor are supported and rotationally driven by the surface mounted drive unit. Rotation of the rotor within the stator produces a pumping action to lift crude oil to the earth's surface.

The surface mounted drive unit is mounted to the well head, and provides a flow tee to direct the crude oil to a pipeline or suitable storage vessel. A conventional stuffing box is located above the flow tee to seal off the relatively rotating rod string drive shaft assembly which penetrates through the flow tee and stuffing box. The drive unit also incorporates a sealed and lubricated bearing housing assembly containing rotary bearings which axially and radially support a spindle/shaft which in turn supports the rod string. The spindle is rotationally driven by a prime mover such as an electric or hydraulic motor. The bearing housing and stuffing box are axially separated by a conventional yoke arrangement which provides the clearance needed to service the stuffing box, and which also provides the space needed to temporarily clamp-off the rod string to support the rod string weight in the event that the bearing housing assembly must be removed for service. The surface mounted drive unit also incorporates coupling means to rotationally drive the rod string. In one popular embodiment, the bearing guided rotary spindle of the bearing housing is hollow and incorporates a hexagonal internal shape which engages and rotationally drives a hexagonal "slip shaft" which is in turn threadedly attached to the rod string.

DESCRIPTION OF THE PROBLEM

One significant remaining weakness of present day progressing cavity artificial lift pumps has been the conventional stuffing box arrangement provided to seal-off the relatively rotating rod string as it enters the yoke area. The stuffing box is filled with conventional packing, which is a far from optimum solution for sealing liquids containing abrasive particulate matter, especially in conjunction with significant differential pressure, as is the case in the artificial lift pump application. Artificial lift pump stuffing boxes require frequent regressing and adjustment by means of a conventional packing gland follower to compensate for wear and minimize crude oil leakage. In many stuffing box applications such as low pressure pumps for non-abrasive liquids, lubrication provided by leakage contributes significantly to the life of the packing, but in the progressing cavity artificial lift pump, the leakage contains abrasives which accelerate packing wear, and cause corresponding wear of the mating rod surface. Adjusting the packing ring gland follower to control leakage is a matter of judgment, and over-tightening can cause high interfacial contact pressures which cause rapid packing failure, resulting in significant crude oil leakage. The packing of the present day progressing cavity artificial lift pump seals directly against the rod string, however a specially prepared rod called a "polished rod" or "polish rod" is provided. The polished rod is manufactured with better surface finish and dimensional tolerance than the remainder of the rod string, with a view towards providing a more suitable rotary sealing surface. Unfortunately, however, the surface of the polished rod quickly becomes damaged from handling and environmental exposure in ways that promote severe packing wear. For example, polished rod corrosion scale, pitting, and impact damage can be very detrimental to packing life.

The drive heads of many progressing cavity artificial lift pumps permit significant dynamic run out of the polished rod, often in conjunction with severe rod string vibration. Such dynamic lateral shaft motion is difficult for any rotary sealing system to accommodate, and tends to wallow out the stuffing box packing and produce unacceptable crude oil leakage. Misalignment between the bearing housing and the stuffing box can also be a concern by creating uneven radial loading of the packing.

SUMMARY OF THE INVENTION

The objective of the present invention is to provide a rotary seal cartridge for progressing cavity artificial lift pump drive heads which is readily adaptable to existing pumps and which provides longer maintenance intervals and service life, and accommodates higher pressure, compared to the conventional stuffing box sealing arrangements now used, and which annunciates impending rotary seal failure and shuts down the pump in the event of complete seal failure so that crude oil spillage does not occur.

An important feature of the invention is the incorporation hydrodynamically lubricated compression-type shaft seals of the type marketed by Kalsi Engineering, Inc. of Sugar Land, Tex. under the registered trademark Kalsi Seals, and covered by U.S. Pat. Nos. 4,610,319 and 5,230,520, and further covered by the following patent applications: Skew and Twist Resistant Hydrodynamic Rotary Shaft Seal, Ser. No. 08/495,272 filed Jun. 27, 1995, and Extrusion Resistant Hydrodynamically Lubricated Multiple Modulus Rotary Shaft Seal, Ser. No. 08/582,086 filed Jan. 2, 1996. Compared to conventional packing, hydrodynamically lubricated rotary seals that are sold under the Registered Trademark, Kalsi Seals are more immune to wear because they have an exclusionary feature which does not permit abrasives to enter the dynamic sealing interface, and they do not require frequent adjustment and regreasing. As a result of their hydrodynamic self-lubricating feature, Kalsi Seals generate considerably less heat and are able to tolerate much higher differential pressure and rotary speeds compared to conventional non-hydrodynamic compression seals. The self-lubricating feature minimizes seal wear, compression set, and other forms of heat related degradation, and thereby provides a sealing life that exceeds other conventional compression seals.

Another important feature of the present invention is a bearing guided sleeve which rotates in unison with the polished rod, and provides a smooth, hardened, true running, abrasion resistant running surface for the rotary seals. By maintaining a constant, non-varying seal extrusion gap, this true-running sleeve preserves the life of the rotary seals by minimizing extrusion damage. This sleeve surrounds the polished rod, but runs true on it's own bearings and does not follow the dynamic run out and vibration induced lateral motion of the polished rod. The exceptionally true running characteristic of the sleeve is insured by (1) exploitation of the hydrostatic force of the pressure of the crude oil process fluid to preload one of the bearings in a way that eliminates internal bearing running clearance, (2) by spring loading of the opposite bearing in a way that eliminates internal bearing running clearance while accommodating differential thermal expansion, and in a way that simultaneously prevents slippage of the inner race and thereby eliminates wear and increased internal clearance that would otherwise result from said slippage, and (3) by axial clamping of the outer bearing races so that the necessary installation clearance between the outer race and the housing bore cannot contribute to dynamic run out. The clamping arrangement also makes the outer races immune from spinning within the housing bore in the event that bearing torque increases due to damage to the bearing running surfaces.

Another feature of the present invention is a mounting means which is configured in a novel way that causes the seal cartridge to center on the polished rod, rather than the stuffing box, thereby making the seal cartridge immune to misalignment between the stuffing box and polished rod. This mounting means is an inexpensive ring shaped part that is separate from the more expensive cartridge housing, and is readily adaptable to the various existing threaded stuffing box adjustment means provided by the various artificial lift pump manufacturers, thereby making the cartridge economically adaptable to many different pump styles.

Another feature of the present invention is a redundant sleeve to polished rod sealing arrangement that can accommodate the dynamic run out and vibration induced lateral motion of the polished rod without suffering premature fatigue and extrusion damage.

Another feature of the present invention is a split drive coupling which clamps to the polished rod and rotationally couples the aforementioned sleeve to the polished rod without causing an axial or lateral couple, thereby isolating the sleeve bearings from differential axial thermal expansion between the yoke and polished rod. The coupling is split so that it can exploit space within the yoke that is occasionally used for clamping off the polished rod. When the polished rod needs to be clamped off within the yoke to temporarily support the weight of the rod string, one can simply remove the split coupling to provide the necessary room for the rod clamps. This coupling is also configured in a way that provides a removable gland wall for a sleeve to polished rod seal. By providing a removable gland wall, the sleeve to rod seal can be installed in a way that prevents sliding damage to the seal. The coupling has a tubular extension which projects inside the sleeve in a way that permits the sleeve bearings to dampen polished rod vibration, thereby prolonging the life of the sleeve to rod seals.

Another feature of the present invention is the use of redundant rotary seals in such a way that failure of a redundant seal provides a signal to the operator so that the operator can plan for a controlled shutdown, and failure of a primary seal sends a signal to the motor controller of the pump so that the pump can be automatically shut down to prevent crude oil spillage. This feature permits remote monitoring of seal performance, and is therefore more economical than an assembly that requires frequent site inspection visits.

A further feature of the present invention is the incorporation of means to provide circulation of air around the cartridge to provide cooling and thereby prolong the life of the rotary seals.

BRIEF DESCRIPTION OF THE DRAWINGS

So that the manner by which the above recited features advantages and objects of the present invention are attained and can be understood in detail, a more particular description of the invention, briefly summarized above, may be had by reference to the appended drawing. It is to be noted, however, that the drawing illustrates only a typical embodiment of this invention and is therefore not to be considered limiting of its scope, for the invention may admit to other equally effective embodiment.

IN THE DRAWINGS

Figure 1:
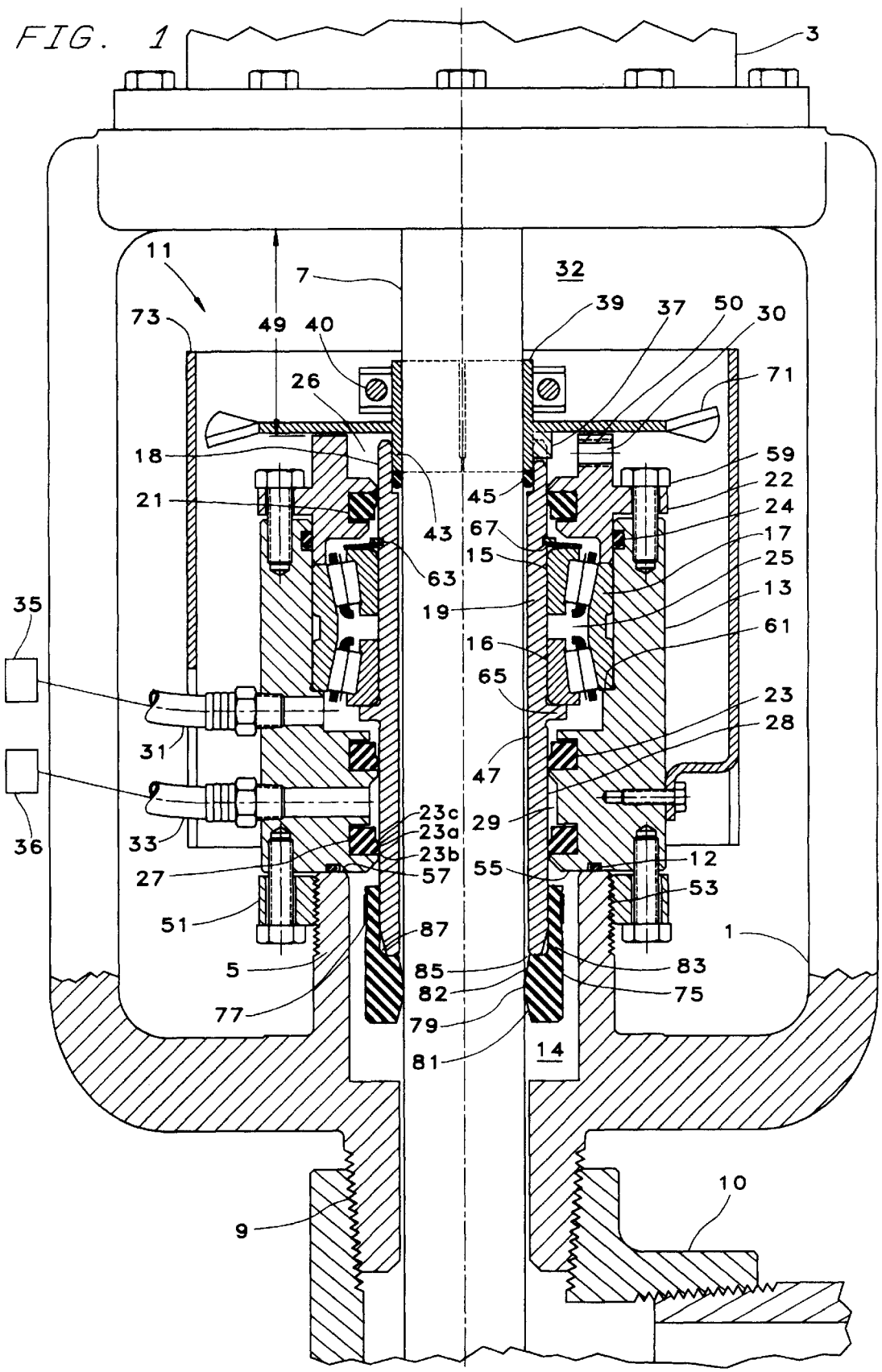

FIG. 1 is a partial sectional view of the yoke portion of the surface mounted drive assembly of an artificial lift pump; said view containing a cross-sectional representation of the preferred embodiment of the rotary seal cartridge of the present invention.

Figure 2:
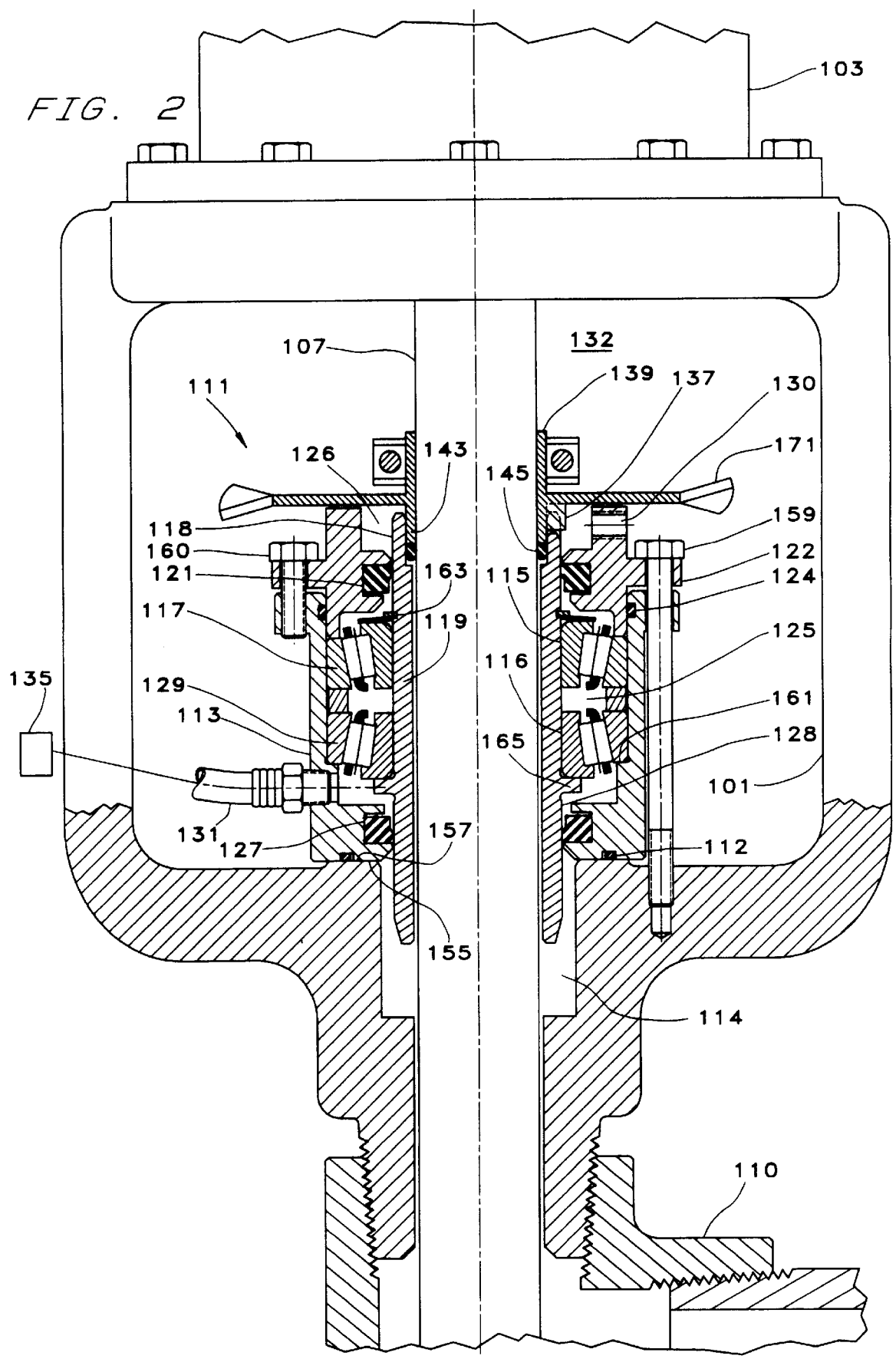

FIG. 2 is a fragmentary sectional view of an alternative embodiment of the present invention having a single lubricant filled bearing chamber.

DETAILED DESCRIPTION OF THE PREFERRED EMBODIMENT

Though the present invention is discussed herein particularly as it relates to rotary drive mechanisms for progressing cavity pumps, such discussion is not intended to limit the spirit and scope of the invention. The invention will also be found to have merit in any apparatus where a driven rotary shaft penetrates a vessel, reservoir, or other structure and is in contact with or contains a liquid so that a seal mechanism is required to contain the liquid and to protect portions of support means which may be in the form of a apparatus from contamination. Referring now to FIG. 1, there is shown the yoke 1, having a drive bearing housing assembly 3, and rotating polished rod 7 drive shaft of the surface mounted drive head assembly of a progressing cavity artificial lift pump. The yoke 1 shown is of conventional O-shaped configuration, and incorporates a conventional stuffing box 5. Yoke 1 also incorporates mounting connection means 9 to connect the lower portion thereof to the uppermost component 10 of the flow tubing arrangement of the well. Said connection means 9 is illustrated as a conventional tapered pipe thread, but could also take other suitable form such as a conventional bolted flange arrangement without departing from the spirit or scope of the invention. The uppermost component 10 of the flow tubing arrangement of the well is illustrated as a flow tee, but could also take other suitable form such as a union or tube section without departing from the spirit or scope of the invention, since the uppermost component actually varies from well to well.

Since the lower end of the yoke 1 is connected to the flow tubing arrangement, the internal cavity 14 of the stuffing box 5 portion of the yoke is filled the process fluid being pumped, i.e. crude oil or gas. The seal cartridge of the present invention is shown generally at 11. The sealed bearing housing 13 of the present invention is sealed with respect to the stuffing box 5 by means of a static seal 12 which is interposed between the housing 13 and the stuffing box 5. Static seal 12 is illustrated as a face sealing O-Ring, but could take other suitable face sealing form, such as a gasket, without departing from the spirit or scope of this invention. The housing 13 of the present invention contains opposed tapered roller bearing components including upper cone 15, lower cone 16 and double cup 17 which provide accurate radial, angular and axial positioning of the rotary wear sleeve 19. Although the tapered roller bearing arrangement is illustrated with a double cup, opposed single cups may also be used without departing from the spirit or scope of the invention. Other bearing types suitable for axially spaced mounting may also be used so long as they offer combined radial, angular and thrust capability.

Rotary seal 21 is constrained and supported by, and has a static sealed relationship with, a removable seal carrier 22 which in turn has a sealed relationship with the housing by means of static seal 24. Seal carrier 22 is shown retained by threaded means 59. Although threaded means 59 is illustrated as a pattern of bolts, it could also be a pattern of studs or other threaded fasteners without departing from the spirit or scope of the invention. Although threaded means 59 is shown engaging a pattern of tapped holes in housing 13, means 59 could alternately pass through or around housing 13 and engage the mounting ring 51 without departing from the spirit or scope of the invention.

Seal carrier 22 defines a circular cavity 26 which is used to collect any eventual weepage from seals 45 and 21. A drain port 30 is provided so that any weepage can be drained to a suitable weepage collection container through tubing or pipe. The level of the liquid within the weepage collection container can be monitored and signaled with a conventional liquid level sensor, which can if desired be used to automatically send a shut-down command to the prime mover which drives the pump, thereby preventing spillage of the weepage fluid which would otherwise occur.

Rotary seals 23 and 27 are constrained and supported by, and have a static sealed relationship with, housing 13. Rotary seals 21 and 23 have a dynamic sealed relationship to the respective cylindrical running surfaces 18 and 28 of rotary wear sleeve 19, and define a first lubricant filled sealed chamber 25 which contains the tapered roller bearing cup 17 and cones 15 and 16. Rotary seals 23 and 27 provide a dynamic seal with respect to the lower seal running surface 28 of the wear sleeve 19 and together define a second lubricant filled sealed chamber 29. The rotary seals 21, 25 and 27 are preferably hydrodynamic seals each having a circular sealing lip in sealing contact with the rotary shaft as shown at 23a, an abrupt circular exclusionary edge 23b on the contaminant side and an annular, axially varying geometry 23c for hydrodynamic contact with lubricant within the lubricant chamber 25 or 29 as the case may be. The lubricant within said first sealed chamber 25 is provided to lubricate the bearing cones 15, 16 and cup 17 and to lubricate rotary seals 21 and 23. The lubricant within the second sealed chamber 29 is provided to lubricate rotary seals 23 and 27 and to protect seal 23 from the deteriorating effects of the process fluid. Rotary seal 21 serves to exclude contaminant matter such as water and dust which may be present in the atmosphere 32 so that said contaminant matter cannot enter said first sealed chamber 25, and also serves to contain the lubricant within chamber 25. Rotary seal 27 serves as a partition between the second sealed chamber 29 and the process fluid within the stuffing box cavity 14 so that the process fluid is excluded from the second sealed chamber 29, and so that the process fluid of the well cannot escape to the atmosphere 32. The first lubricant chamber 25 is connected to a first leakage sensor 35 such as a pressure sensing switch by communication means 31 which may take any convenient form, such as the tube which is illustrated. The second sealed chamber 29 is connected to a second leakage sensor 36 such as a pressure sensing switch by a communication means 33, such as a tube. Axial hydraulic force resulting from the pressure difference between the process fluid within the stuffing box cavity 14 and the lubricant within the second sealed chamber 29 serves to constrain seal 27 in a perpendicular relationship with respect to the axis of the wear sleeve 19. Said perpendicular relationship is highly desirable in order to prevent impingement of process fluid abrasives against the seal 27 which would occur and cause seal wear if the seal were permitted to skew within its housing groove.

Since rotary seal 27 is exposed to the deteriorating effects of the process fluid, it will fail before rotary seal 23, which operates in a clean lubricated environment, and has no intentional differential pressure acting across it. Rotary seal 27 is therefore a redundant sacrificial seal, which upon failure does not compromise the bearings or the sealing integrity of the cartridge. When rotary seal 27 fails, the resulting pressure change in communication means 33 is detected by said second pressure switch which is used to signal the failure of seal 27 to the person responsible for pump maintenance so that a planned shut-down can be scheduled for cartridge replacement.

After seal 27 fails, seal 23 is then exposed to the deteriorating effects of the process fluid, but is still capable of considerable functional operating life because until the failure of seal 27, seal 23 had been operating in a clean protected lubricant environment. Seal 23 will fail prior to seal 21 because seal 23 is exposed to the deteriorating effects of the process fluid after the failure of seal 27. When rotary seal 23 eventually fails, the resulting pressure change in communication means 31 is detected by said first pressure switch which is used to automatically send a shut-down command to the prime mover which drives the pump, thereby preventing spillage of the process fluid which would otherwise occur.

Since the polished rod may possess surface defects such as corrosion scale and pipe wrench teeth marks, the interior surface 47 of the wear sleeve is sized to clear such defects so that assembly can take place without interference between the polished rod and wear sleeve. The wear sleeve 19 is rotationally driven by a drive tang 37 of split drive coupling 39. The tang 37 is received within a drive slot of sleeve 19 so that rotation of the split drive coupling by the drive shaft imparts rotation to the wear sleeve. Drive coupling 39 is frictionally clamped to the polished rod 7 by a threaded fastener or fasteners, such a the U-bolt clamp arrangement 40 which is illustrated. Split drive coupling 39 could also be clamped to the polished rod by an alternate fastener arrangement without departing from the spirit or scope of the invention; for example, the clamp halves could be made large enough to be drilled and tapped for clamp screws, or a screw driven band clamp could be used to clamp the drive coupling halves to the polished rod. Since the polished rod 7 is axially supported by the assembly 3 while the wear sleeve 19 is axially supported by the bearing components 15, 16 and 17, axial clearance is provided between the lower surfaces of the split clamp and the upper surfaces of the wear sleeve so that differential thermal expansion can occur freely without axially overloading the bearing components 15, 16 and 17. A tubular extension 43 of the split drive coupling extends into an annular cavity in the wear sleeve 19 and thereby forms a removable gland wall for seal 45. Seal 45 establishes a seal between the sleeve and the polished rod thereby preventing escape of the process fluid to the atmosphere. Because the split drive coupling forms a removable gland wall, seal 45 can be inserted after wear sleeve 19 has been telescoped over polished rod 7, thereby protecting seal 45 from installation damage; if seal 45 were instead held in a fixed gland and forced over the defects present on the surface of the polished rod during cartridge installation, it would most likely become cut by these surface defects and fail to seal. The tubular extension 43 of the split drive coupling 39 has a close fitting relationship with the exterior of the polished rod and with the interior of the wear sleeve cavity so that dynamic vibration of the polished rod is limited by bearing components 15, 16 and 17, thereby preserving the life of seal 45. Another critical advantage of the split drive coupling is that it can be temporarily removed so that yoke axial length 49 can be temporarily used by rod clamps which are occasionally used to support the polished rod 7 and the attached weight of the rod string in the event that assembly 3 must be replaced. In such cases, the rod clamps (and the weight of the rod string) bear against surface 50 of seal carrier 22. Another service provided by clamp 39 is to prevent rain water from entering weepage collection cavity 26.

A mounting ring 51 is provided to retain housing 13 to the to the stuffing box 5 portion of the yoke 1. The mounting ring 51 is attached to the yoke stuffing box by threads 53 as shown, or by any other suitable means of connection. In FIG. 1, threaded means 53 is illustrated as a large screw thread because this packing adjustment thread configuration is popular on some brands of artificial lift pumps. Threaded means 53 can alternately be a pattern of bolts or studs (another common packing adjustment thread configuration) without departing from the spirit or scope of this invention. Indeed, the economical adaptability of the seal cartridge of this invention to a variety of yoke configurations is one of the key features of the invention.

Because of the planar relationship between the lower surface 55 of the housing and the mating upper surface 57 of the stuffing box, during the process of installation the housing is automatically centered coaxially with respect to the polished rod 7 by the installed compressive force of seal 45, thereby eliminating the misalignment between the cartridge and drive shaft that would occur if the cartridge were instead radially located by a piloting relationship with the stuffing box. If the wear sleeve were not well centered on the polished rod, seal 45 would suffer constantly changing compression (which would cycle from minimum to maximum compression once during each revolution) which would lead to premature seal failure. It therefore can be appreciated that the self centering feature of the present invention contributes significantly to its successful operation. It can also be appreciated that the mounting ring is relatively inexpensive compared to the cost of the housing, and can be economically made in the many configurations required to adapt the cartridge to the different yoke configurations of the various pump manufacturers.

The seal carrier 22 is retained by threaded fasteners 59 which clamp cup 17 against an interior shoulder 61 of the housing 13, thereby preventing radial and axial motion between the cup 17 and the housing, which helps to minimize lateral dynamic motion between the sleeve 19 and housing 13 which has been found to be detrimental to the life of the rotary seals 21, 23 and 27 and to the outer seal rubbing surfaces 18 and 28 of the wear sleeve 19. The wear sleeve 19 is axially constrained to the bearing elements by retaining ring 63 which also serves to support the weight of the wear sleeve in the absence of process fluid pressure. When process fluid pressure is present in the internal cavity 14 (such as when the pump is rotating), an upwardly acting axial hydraulic force is imposed on the wear sleeve by process fluid pressure acting over the pressure responsive hydraulic area between the outer surface diameter of the polished rod at its engagement by seal 45, and the sealing surface diameter of the wear sleeve at its engagement by rotary seal 27. This axial hydraulic force is conveyed from the wear sleeve to the bearing elements by wear sleeve shoulder 65.

Radial internal clearance is required between the cup and cone elements of the tapered roller bearing arrangement so that differential thermal expansion does not impose destructive loads on the bearing elements. With tapered roller bearings, such internal radial clearance is ordinarily provided by carefully controlling the axial free play. In this invention, a disk spring 67 interposed between the retaining ring 63 and the upper cone 15 provides a moderate axial preload that takes up axial and radial internal bearing clearance (by axial sliding of the upper cone), yet accommodates differential thermal expansion via spring flexure. This provision helps to minimize lateral dynamic motion between the sleeve and housing; such dynamic motion has been found to be detrimental to the life of the rotary seals and to the outer seal rubbing surfaces of the wear sleeve 19. The minimization of dynamic run out of the sleeve preserves the life of the rotary seals by minimizing extrusion damage thereto because the seal extrusion gap between the housing and sleeve is maintained at a relatively constant, non-varying dimension so that any extruded seal material is not subjected to cyclic fatigue. (Dynamic run out of the sleeve would tend to pinch or "nibble" away at any seal material extruded into the gap; the resulting loss of seal material would significantly shorten seal life.) The true-running sleeve of the present invention also permits a very small extrusion gap between the housing and wear sleeve without metal to metal rubbing contact; such a small extrusion gap inhibits extrusion of seal material because the seal is better supported. The true running sleeve of the present invention also minimizes the entrapment and crushing of abrasives in the clearance gap between the housing and the relatively moving wear sleeve, which causes wear to the sleeve, and ultimately the seals. Abrasives are continually present in the housing to sleeve extrusion gap of the process side rotary seal. If dynamic run out occurs, the sleeve to housing clearance is increased over approximately one half of the circumference of the sleeve, and decreased over the other half such that abrasives within the clearance are crushed and ground into the wear sleeve, causing damage to the sleeve.

The contact friction between the disk spring 67 and the upper cone 15 inhibits relative rotation between the cone 15 and the wear sleeve 19 which, if permitted, would cause wear which would permit increased dynamic run out of the wear sleeve. By preventing such wear, the true-running nature of the sleeve is preserved. The previously described upwardly acting hydraulic force also serves to forcefully eliminate internal clearance between the bearing cup 17 and the lower bearing cone 16, thus insuring that polished rod vibration is reacted and controlled by the lower cone. If the hydraulic force were not thus exploited, an axial component of the radial load imposed by polished rod vibration could easily overcome the moderate axial force of spring 67, allowing the upper cone to slide upward, which would open up the radial internal bearing clearance and permit dynamic run out of the sleeve.

Rotary seals of any suitable configuration will benefit from the precise true running sleeve of the present invention, however the preferred embodiment shown in FIG. 1 incorporates resilient hydrodynamically lubricated compression-type shaft seals of the type marketed by Kalsi Engineering, Inc. of Sugar Land, Tex. under the registered trademark Kalsi Seals and covered by U.S. Pat. Nos. 4,610,319 and 5,230,520, and further covered by the following patent applications: Skew and Twist Resistant Hydrodynamic Rotary Shaft Seal, Ser. No. 08/495,272 filed Jun. 27, 1995, and Extrusion Resistant Hydrodynamically Lubricated Multiple Modulus Rotary Shaft Seal, Ser. No. 08/582,086 filed Jan. 2, 1996. The inner surface of a hydrodynamic Kalsi Seals type rotary seal has a unique geometry that promotes increased seal life by lubricating the dynamic seal-to-wear sleeve interfacial zone and by excluding process fluid abrasives from the shaft sealing interface. The patented geometry incorporates a wavy, axially varying edge on the lubricant side of the inner diameter, and an abrupt straight edge on the environmental side. As relative rotation takes place, the wave shape on the lubricant side, which has a gradually converging shape in the axial and circumferential directions, generates a hydrodynamic wedging action which introduces a minute lubricant film between the seal and the wear sleeve. This film physically separates the seal and the wear sleeve, which prevents the typical dry rubbing type of wear and heat generation associated with a conventional non-hydrodynamic compression type seal, and thereby prolongs seal and mating wear sleeve life. The abrupt circular edge on the environmental side of the hydrodynamic seal does not generate a wedging action, and thereby helps to exclude particulate contaminants from the seal to shaft interface. Thus, the term "hydrodynamic seals" as employed in this specification is intended to mean seals of the construction and function as set forth in the above-noted patents and patent applications of Kalsi Engineering, Inc.

Kalsi Seals are the seal of choice for the preferred embodiment of the present invention because the exclusionary feature thereof makes them eminently suitable for pressure retaining service with the abrasive-laden process fluid, and because the self-lubricating feature thereof prevents the dry rubbing frictional wear associated with conventional seals, and as a result generates less heat than competitive seals. When Kalsi Seals are used, such as in the preferred embodiment, communication means 31 and 33 are also used (in addition to connecting to the pressure switch previously noted) to connect each of the two sealed chambers of the cartridge to its own separate lubricant supply reservoir (not shown). If desired, these lubricant supply reservoirs may be pressurized so that the lubricant pressure is greater than that of the process fluid, or they may be unpressurized so that the lubricant pressure is less than that of the process fluid. In the preferred embodiment the lubricant level is sensed by conventional means, such as a magnetic level gage, float switch, linear variable displacement transducer, or sight glass. Since any seal or bearing has a longer operating life if not exposed to excessively high temperatures, the present invention incorporates air cooling means to dissipate heat generated by the seals and bearings. The split drive coupling 39 incorporates fan blade elements 71 that force air to flow axially over the outer surface of the housing 13, thereby cooling the seal cartridge assembly. The air flow is guided around the housing by a cylindrical shroud 73 which also serves as a safety guard, and furthermore shades the housing from the solar heat of direct sunlight. No annunciation feature is provided to signal maintenance personnel in the event that seal 45 fails, therefore a redundant sleeve to polished seal is provided below seal 45 to protect seal 45 from the deteriorating effects of exposure to the pressurized process fluid and the abrasive contaminant matter contained therein. The redundant seal can take any suitable form, such as a conventional O-Ring or split packing ring, however in the preferred embodiment illustrated, the redundant seal takes the form of flexing elastomeric boot 75. Flexing boot 75 is retained to the sleeve by clamp ring 77. Prior to installation, the inside diameter of the sealing lip 79 is smaller in diameter than the polished rod 7. During installation, the sealing lip is guided onto the polished rod and gently stretched to fit the polished rod by interaction between the end of the polished rod and one of the internal conical guiding shapes 81 and 82 of the flexible boot. Tapered guiding shapes 81 and 82 are adjacent to seal lip 79 and oppositely directed to facilitate polished rod installation from either potential direction of polished rod installation movement. Since the boot is stretched over the polished rod, a light seal-initiating contact force results between sealing lip 79 and the polished rod. This sealing force is lighter than that achieved with a direct compression seal such as an O-ring, therefore the risk of seal damage is minimized as sealing lip 79 traverses the over the many defects which may be present on the surface of the polished rod. The tapered guiding surfaces 81 and 82 help to lift the sealing lip 79 over polished rod surface defects so that the defects do not plow through the lip and cut it. Radial motion between the polished rod and sleeve is absorbed by flexing of a flexible tubular portion 83 of the boot. When process fluid pressure is present, pressure acting on unsupported (unpressurized) interior regions 85 and 87 causes the boot to grip the rod more tightly and thus enhance the contact pressure between the sealing lip 79 and the rod.

Although the present invention is described and illustrated herein particularly as it relates to sealing off the rod string of an artificial lift pump, it should be born in mind that such is not intended to limit the spirit and scope of the invention, for the invention will find a wide variety of uses in circumstances where rotary shafts are employed to penetrate a vessel boundary, particularly when said vessel confines a liquid which contains abrasive particulate matter.

As can be appreciated from the previous summary of the invention, and from the present seal cartridge description set forth in conjunction with FIG. 1, the invention is of a very simple configuration which overcomes all of the problems enumerated previously in respect to present artificial lift pump rod seal implementations, thus greatly improving the performance and reliability of artificial lift pumps and other similarly difficult rotary sealing applications.

DESCRIPTION OF AN ALTERNATE EMBODIMENT

The previously described preferred embodiment is a redundant system by virtue of the multiplicity of sealed lubricant chambers that comprise its design, and is technically known as a "Fail Operational-Fail Safe" type system. The "Fail-Operational" portion of this designation stems from the fact that in the event the lower sealed chamber is compromised, the equipment can continue to operate normally with the upper sealed chamber. The "Fail-Safe" portion of the designation stems from the fact that when the top seal chamber is compromised, the equipment is automatically shut down; i.e. placed in a safe mode so that process fluid leakage to the environment does not occur.

The alternate embodiment, shown in FIG. 2, is a "Fail Safe" design having only a single sealed lubricant chamber 125 defined by rotary seals 121 and 127, one or both of which may be Kalsi Seals brand hydrodynamically lubricated seals. When the single sealed lubricant chamber 125 is compromised by leakage of process fluid past the seal 127, the resulting pressure change in sealed chamber 125 is sensed through passage 131 by sensor 35, and the equipment is automatically shut down by a signal sent from the sensor to the controller of the prime mover.

In FIG. 2, there is shown the O-shaped yoke 101, and drive bearing housing assembly 103 of an apparatus wherein rotating drive shaft 107 passes through a cavity within the yoke 114 and into a reservoir 110 which contains a process fluid. The seal cartridge of the present invention is shown generally at 111. The sealed bearing housing 113 of the present invention is sealed with respect to the yoke by means of a face-sealing static seal 112. The housing 113 contains axially spaced bearing components including cones 115 and 116 and cups 117 and 129 which provide accurate, angular radial and axial positioning of rotary wear sleeve 119.

Rotary seal 121 has a static sealed relationship with seal carrier 122 which has a sealed relationship with housing 113 via static seal 124. A cavity 126 is used to collect weepage from seals 145 and 121 which is drained via port 130 to a suitable container, the liquid level whereof may be monitored via a sensor.

Rotary seal 127 has a static sealed relationship with housing 113. Rotary seals 121 and 127 have a dynamic sealed relationship to the respective cylindrical running surfaces 118 and 128 of rotary wear sleeve 119, and define lubricant filled sealed chamber 125, the lubricant whereof lubricates the bearings and rotary seals. Rotary seal 121 excludes contaminant matter from sealed chamber 125, and contains the lubricant within chamber 125. Rotary seal 127 serves as a partition between sealed chamber 125 and the process fluid within cavity 114. Lubricant chamber 125 is connected to a leakage sensor 135 such as a pressure sensing switch, chemical sensing switch, or liquid level sensing switch by communication means 131. If rotary seal 127 fails, the resulting signal from sensor 135 is used to shut down the prime mover which drives the apparatus, thereby preventing spillage of the process fluid which would otherwise occur.

Wear sleeve 119 is rotationally driven by a drive tang 137 of drive coupling 139. Tang 137 is received within a drive slot of sleeve 119 so that the drive coupling imparts rotation to the wear sleeve. Coupling 139 is rotationally and axially fixed to drive shaft 107 by any suitable means, such as a clamp or a set screw arrangement. Axial clearance is provided between the lower surfaces of the clamp and the upper surfaces of the wear sleeve so that differential thermal expansion there-between can occur freely without axially overloading the bearings. A tubular extension 143 of the drive coupling extends into an annular cavity in the wear sleeve 119 and forms a removable gland wall for seal 145, which establishes a seal between sleeve 119 and drive shaft 107 thereby preventing escape of the process fluid to the atmosphere. Tubular extension 143 of drive coupling 139 has a close fitting relationship with the exterior of the drive shaft and the interior of the wear sleeve cavity so that vibration of the drive shaft is limited by the bearings. Coupling 139 may incorporate fan blade elements 171 to force air to flow over housing 113, thereby cooling the seal cartridge.

Mounting means in the form of threaded connectors 159 are provided to retain the seal cartridge to yoke 101. In FIG. 2, threaded connectors 159 engage tapped holes in yoke 101 which are provided on many different types of apparatus to adjust stuffing box packing. Because of the planar relationship between the lower surface 155 of the housing and the mating upper surface 157 of the yoke, during the process of installation the housing is automatically centered coaxially with respect to the drive shaft 107 by the installed compressive force of seal 145.

The seal carrier 122 is retained by threaded fasteners 159 and 160 which clamp cups 117 and 129 against an interior shoulder 161 of the housing 113, thereby preventing radial motion between the cups and the housing. When process fluid pressure is present in internal cavity 114, an upwardly acting axial hydraulic force is imposed on the wear sleeve by process fluid pressure acting over the pressure responsive hydraulic area between the outer surface diameter of the drive shaft at its engagement by seal 145, and the sealing surface diameter of the wear sleeve at its engagement by rotary seal 127. This axial hydraulic force is conveyed from the wear sleeve to the bearing elements by wear sleeve shoulder 165, and serves to forcefully eliminate internal clearance between the bearing cup 117 and the lower bearing cone 116.

What is claimed is:

1. In apparatus having a rotary drive shaft penetrating into a reservoir having process fluid therein wherein the apparatus defines support means having an internal cavity through which the rotary drive shaft extends, the improvement comprising:

(a) a seal cartridge having a bearing housing;
   (b) mounting means securing said seal cartridge to the support means;
   (c) a rotary wear sleeve being positioned for rotation within said bearing housing and defining a central passage through which said rotary drive shaft extends;
   (d) bearing means mounting said rotary wear sleeve for rotation within said bearing housing;
   (e) rotary seal means having dynamic sealing engagement with said rotary wear sleeve, said rotary seal means defining first and second lubricant filled sealed chambers located about said rotary wear sleeve and being isolated from said rotary shaft by said rotary wear sleeve, said first lubricant filled sealed chamber having said bearing means located therein;
   (f) a removable longitudinally split drive coupling being secured in fixed relation about said rotary drive shaft and having rotary driving relation with said rotary wear sleeve; and
   (g) said rotary wear sleeve being positioned axially and radially by said bearing means in a manner independent from axial and radial mounting of said rotary drive shaft.

2. The improvement of claim 1, wherein said bearing means comprises:

a pair of bearings being within said bearing housing.

3. The improvement of claim 2, wherein said pair of bearings comprise opposed tapered roller bearings.

4. The improvement of claim 1, wherein:

(a) a seal carrier being threadedly secured to said bearing housing; and
   (b) said rotary seal means being a plurality of circular seals, at least one of said circular seals being supported by said seal carrier.

5. The improvement of claim 4, wherein:
said seal carrier retaining said bearing means within said bearing housing.

6. The improvement of claim 1, wherein:
(a) first and second liquid passage means being in communication respectively with said first and second lubricant filled sealed chambers; and
(b) leakage sensor means being provided respectively for said first and second liquid passage means for sensing lubricant leakage from either of said first and second lubricant filled sealed chambers which upon sensing leakage produces a signal to terminate said rotation of said rotary wear sleeve.

7. The improvement of claim 1, wherein at least 1 of said rotary seal means being a hydrodynamic sealing element comprising:
(a) a circular resilient seal body defining a lubricant side and a contaminant side;
(b) a circular sealing lip being defined by said circular resilient seal body and defining a circular dynamic sealing surface and having an axially varying hydrodynamic geometry facing said lubricant side; and
(c) a circular non-axially varying exclusionary geometry being defined by said circular sealing lip and facing said contaminant side.

8. The improvement of claim 6, wherein: said leakage sensor means comprises a sensor which detects the pressure change occurring in said liquid passage means as a result of leakage of said rotary seal means.

9. In apparatus having a rotary drive shaft penetrating into a reservoir having process fluid therein wherein the apparatus defines support means having an internal cavity through which the rotary drive shaft extends, the improvement comprising:
(a) a seal cartridge having a bearing housing;
(b) mounting means securing said seal cartridge to the support means;
(c) a rotary wear sleeve being positioned for rotation within said bearing housing and defining a central passage through which said rotary drive shaft extends;
(d) bearing means mounting said rotary wear sleeve for rotation within said bearing housing;
(e) rotary seal means having dynamic sealing engagement with said rotary wear sleeve, said rotary seal means defining first and second lubricant filled sealed chambers located about said rotary wear sleeve, said first lubricant filled sealed chamber having said bearing means located therein;
(f) a removable split drive coupling being secured in fixed relation about said rotary drive shaft and having rotary driving relation with said rotary wear sleeve; and
(g) seal means establishing a seal between said rotary wear sleeve and the rotary drive shaft and substantially centering said rotary wear sleeve with respect to the rotary drive shaft.

10. The improvement of claim 9, wherein said split drive coupling retaining said seal means in centering and sealing position with said rotary wear sleeve and the rotary drive shaft.

11. The improvement of claim 9, wherein:
(a) said bearing means having internal radial clearance;
(b) said seal means and said rotary seal means defining a pressure responsive wear sleeve area being exposed to the pressure of process fluid within said reservoir, and
(c) the process fluid pressure acting on said pressure responsive wear sleeve area developing an axially oriented resultant force on and through said rotary wear sleeve to said bearing means for reducing said internal radial clearance of said bearing means.

12. In apparatus having a rotary drive shaft penetrating into a reservoir having process fluid therein wherein the apparatus defines support means having an internal cavity through which the rotary drive shaft extends, the improvement comprising:
(a) a seal cartridge having a bearing housing;
(b) mounting means securing said seal cartridge to the support means;
(c) a rotary wear sleeve being positioned for rotation within said bearing housing and defining a central passage through which said rotary drive shaft extends;
(d) bearing means mounting said rotary wear sleeve for rotation within said bearing housing;
(e) rotary seal means having dynamic sealing engagement with said rotary wear sleeve, said rotary seal means defining first and second lubricant filled sealed chambers located about said rotary wear sleeve, said first lubricant filled sealed chamber having said bearing means located therein;
(f) a removable split drive coupling being secured in fixed relation about said rotary drive shaft and having rotary driving relation with said rotary wear sleeve; and
(g) said split drive coupling having coupling sections with each section having fan elements thereon for moving air about said bearing housing for the purpose of air cooling said housing.

13. In apparatus having a rotary drive shaft penetrating into a reservoir having process fluid therein wherein the apparatus defines support means having an internal cavity through which the rotary drive shaft extends, the improvement comprising:
(a) a seal cartridge having a bearing housing;
(b) mounting means securing said seal cartridge to the support means;
(c) a rotary wear sleeve being positioned for rotation within said bearing housing and defining a central passage through which said rotary drive shaft extends;
(d) bearing means mounting said rotary wear sleeve for rotation within said bearing housing;
(e) rotary seal means having dynamic sealing engagement with said rotary wear sleeve, said rotary seal means defining first and second lubricant filled sealed chambers located about said rotary wear sleeve, said first lubricant filled sealed chamber having said bearing means located therein; and
(f) a removable split drive coupling being secured in fixed relation about said rotary drive shaft and having rotary driving relation with said rotary wear sleeve.
(g) a shroud surrounding said bearing housing and having at least a portion thereof disposed in spaced relation about said bearing housing and thus defining an air flow annulus thereabout; and
(h) said split drive coupling having coupling sections with each section having fan elements thereon, said fan elements inducing air flow in said air flow annulus upon rotation of the rotary drive shaft.

14. In apparatus having a rotary drive shaft penetrating into a reservoir having process fluid therein wherein the apparatus defines support means having an internal cavity through which the rotary drive shaft extends, the improvement comprising:

(a) a seal cartridge having a bearing housing;

(b) mounting means securing said seal cartridge to the support means;

(c) a rotary wear sleeve being positioned for rotation within said bearing housing and defining a central passage through which said rotary drive shaft extends;

(d) bearing means mounting said rotary wear sleeve for rotating within said bearing housing;

(e) rotary seal means having dynamic sealing engagement with said rotary wear sleeve, said rotary seal means defining first and second lubricant filled sealed chambers located about said rotary wear sleeve, said first lubricant filled sealed chamber having said bearing means located therein;

(f) a removable split drive coupling being secured in fixed relation about said rotary drive shaft and having rotary driving relation with said rotary wear sleeve;

(g) an annular elastomeric boot being secured about one end of said rotary wear sleeve and defining a circular sealing lip for sealing and centralizing engagement with said rotary drive shaft;

(h) said annular elastomeric boot defining at least one tapered internal guiding surface permitting guiding of said annular elastomeric boot over the rotary drive shaft during assembly and disassembly; and (i) said annular elastomeric boot being pressure responsive to process fluid pressure externally thereof for enhancing contact force of said circular sealing lip thereof with said rotary drive shaft.

15. In apparatus having a rotary drive shaft penetrating into a reservoir having process fluid therein wherein the apparatus defines support means having an internal cavity through which the rotary drive shaft extends, the improvement comprising:

(a) a seal cartridge having a generally cylindrical bearing housing defining first and second axial ends;

(b) mounting means securing said seal cartridge to the support means;

(c) a rotary wear sleeve being positioned for rotation within said bearing housing and defining a central passage through which the rotary drive shaft extends;

(d) bearing means providing radial and axial mounting of said rotary wear sleeve for rotation of said rotary wear sleeve within said bearing housing; and (e) axially spaced rotary sealing elements being located within said seal cartridge and having dynamic sealing engagement with said rotary wear sleeve, said rotary sealing elements defining at least one lubricant filled sealed chamber located about said rotary wear sleeve, said lubricant filled sealed chamber having said bearing means located therein, at least one of said rotary sealing elements being a resilient hydrodynamically lubricated seal.

16. The improvement of claim 15, wherein a removable split drive coupling being secured in fixed relation about the rotary drive shaft and having rotary driving relation with said rotary wear sleeve for rotation of said rotary wear sleeve.

17. The improvement of claim 15, wherein shaft seal means establishing a seal between said rotary wear sleeve and the rotary drive shaft and substantially centering said rotary wear sleeve with respect to the rotary drive shaft.

18. The improvement of claim 17, wherein:

(a) a removable split drive coupling being secured in fixed relation about the rotary drive shaft and having rotary driving relation with said rotary wear sleeve for rotation of said rotary wear sleeve, and (b) said split drive coupling retaining said shaft seal means in centering and sealing position with said rotary wear sleeve and the rotary drive shaft.

19. The improvement of claim 15, wherein said bearing means comprise axially spaced tapered roller bearings.

20. The improvement of claim 15, wherein:

(a) a seal carrier being secured to said bearing housing; and (b) at least one of said rotary sealing elements being supported by said seal carrier.

21. The improvement of claim 20, wherein:

said seal carrier having retaining engagement with said bearing means.

22. The improvement of claim 15, wherein:

(a) liquid passage means being in communication with said lubricant filled sealed chamber; and (b) leakage sensor means being provided for said liquid passage means for sensing leakage of said rotary sealing elements.

23. The improvement of claim 22, wherein: said leakage sensor means comprises a sensor which detects the pressure change occurring in said liquid passage means as a result of leakage of either of said rotary sealing elements.

24. The improvement of claim 15, wherein at least one of said axially spaced rotary sealing elements being a hydrodynamically lubricated seal comprising:

(a) a circular seal body defining a lubricant side and a contaminant side;

(b) a circular sealing lip defining a circular sealing surface and having an axially varying hydrodynamic geometry facing said lubricant side; and (c) a circular non-axially varying exclusionary edge being defined by said circular sealing lip and facing said contaminant side.

25. The improvement of claim 15, wherein:

(a) an annular elastomeric boot being secured about one end of said rotary wear sleeve and defining a circular sealing lip for centralizing engagement with said rotary drive shaft; and (b) said annular elastomeric boot defining at least one tapered internal guiding surface permitting guiding of said annular elastomeric boot over the rotary drive shaft during assembly and disassembly, and;

(c) said annular elastomeric boot being pressure responsive to process fluid pressure externally thereof for enhancing contact force of said circular sealing lip thereof with said rotary drive shaft.

26. The improvement of claim 17, wherein:

(a) said bearing means having radial internal clearance;

(b) said shaft seal means and said rotary sealing elements defining a pressure responsive wear sleeve area being exposed to the pressure of process fluid within said reservoir, and (c) the process fluid pressure acting on said pressure responsive wear sleeve area and developing an axially oriented resultant force on and through said rotary wear sleeve to said bearing means for reducing said radial internal clearance of said bearing means.

27. In apparatus having a rotary drive shaft penetrating into a reservoir having process fluid therein wherein the apparatus defines support means having an internal cavity through which the rotary drive shaft extends, the improvement comprising:

(a) a seal cartridge having a generally cylindrical bearing housing having first and second axial ends;

(b) mounting means securing said seal cartridge to said support means;

(c) a rotary wear sleeve being positioned for rotation within said bearing housing and defining a central passage through which the rotary drive shaft extends;

(d) bearing means providing radial and axial mounting of said rotary wear sleeve for rotation within said bearing housing; and (e) axially spaced rotary sealing elements being located within said bearing housing and having dynamic sealing engagement with said rotary wear sleeve, said rotary sealing elements defining at least one lubricant filled sealed chamber located about said rotary wear sleeve, said lubricant filled sealed chamber having said bearing means located therein;

(f) a removable split drive coupling being secured in fixed relation about the rotary drive shaft and having rotary driving relation with said rotary wear sleeve for rotation of said rotary wear sleeve, said split drive coupling having fan elements thereon for moving air about said bearing housing.

28. In apparatus having a rotary drive shaft penetrating into a reservoir having a process fluid therein and wherein the apparatus is provided with support means defining an internal cavity through which the rotary drive shaft extends, the internal cavity during use of the apparatus having process fluid therein, the improvement comprising:

(a) a seal cartridge having a bearing housing;

(b) mounting means securing said seal cartridge to the support means;

(c) a rotary wear sleeve being positioned for rotation within said bearing housing;

(d) bearing means mounting said rotary wear sleeve for rotation within said bearing housing;

(e) rotary seal means being located within said seal cartridge and having dynamic sealing engagement with said rotary wear sleeve, said rotary seal means defining lubricant filled seal chamber means within said bearing housing and about said rotary wear sleeve;

(f) means for sensing the presence of leaked process fluid within said lubricant filled seal chamber means and thus annunciating leakage of process fluid from the internal cavity past said rotary seal means and into said bearing housing; and (g) said rotary wear sleeve being positioned axially and radially by said bearing means in a manner independent from axial and radial mounting of said rotary drive shaft.

29. The improvement of claim 28 wherein:

(a) said bearing means having internal radial clearance;

(b) seal means establishing a seal between said rotary wear sleeve and said rotary drive shaft, said seal means and said rotary seal means defining a pressure responsive rotary wear sleeve area being exposed to the pressure of process fluid within said internal cavity, and (c) the process fluid pressure acting on said pressure responsive rotary wear sleeve area developing an axially oriented resultant force on and through said rotary wear sleeve to said bearing means for reducing said radial internal clearance of said bearing means.

* * * * *